(12) United States Patent
Litt et al.

(10) Patent No.: US 11,406,912 B2
(45) Date of Patent: Aug. 9, 2022

(54) COMPRESSED GAS DRYING SYSTEM

(71) Applicant: AGISEN LIMITED, Melton Mowbray (GB)

(72) Inventors: Timothy John Litt, Oakham (GB); Stuart Charles Murray, Oakham (GB)

( * ) Notice: Subject to any disclaimer, the term of this patent is extended or adjusted under 35 U.S.C. 154(b) by 160 days.

(21) Appl. No.: 16/345,693

(22) PCT Filed: Oct. 27, 2017

(86) PCT No.: PCT/GB2017/053242
§ 371 (c)(1),
(2) Date: Apr. 26, 2019

(87) PCT Pub. No.: WO2018/078382
PCT Pub. Date: May 3, 2018

(65) Prior Publication Data
US 2019/0255459 A1    Aug. 22, 2019

(30) Foreign Application Priority Data

Oct. 28, 2016 (GB) .................................. 1618232

(51) Int. Cl.
*B01D 5/00* (2006.01)
*B01D 53/26* (2006.01)

(52) U.S. Cl.
CPC ............. *B01D 5/0009* (2013.01); *B01D 5/00* (2013.01); *B01D 53/26* (2013.01); *B01D 53/265* (2013.01);
(Continued)

(58) Field of Classification Search
CPC ........ B01D 5/0009; B01D 5/00; B01D 53/26; B01D 53/265; B01D 53/261; B01D 53/268; B01D 2257/80; B01D 2258/06
(Continued)

(56) References Cited

U.S. PATENT DOCUMENTS 5,681,368 A * 10/1997 Rahimzadeh ........ B01D 53/268
                                                                          95/19
2007/0256430 A1    11/2007 Prueitt

FOREIGN PATENT DOCUMENTS

DE            99839 A1    8/1973
FR          3003476 A1    9/2014

OTHER PUBLICATIONS

Written Opinion and International Search Report for related application PCT/GB2017/053242, dated Jan. 8, 2018; 10 pages.

* cited by examiner

*Primary Examiner* — Ana M Vazquez
(74) *Attorney, Agent, or Firm* — Ortiz & Lopez, PLLC; Kermit D. Lopez; Luis M. Ortiz

(57) ABSTRACT

The invention provides a method and system for suppressing the dew point of a compressed gas to a minimum level below ambient temperature by controlling pressure, cooling and removing liquid water condensate from the compressed gas prior to storage in a receiver vessel and/or delivery to point of use. In one embodiment, the method has an air intake for accepting ambient air having any level of water vapour content, a compressor for compressing the air, a heat exchanger which cools the compressed air and sets the water vapour content of the air to a value determined by the pressure and the exit temperature of air in the heat exchanger, a liquid water separation device which removes condensed liquid water, a pressure control valve which ensures the maintenance of a minimum set pressure in the upstream system, an air receiver to act as a reservoir for the delivery of unsaturated compressed air and a main system regulation valve used to limit the maximum pressure of the compressed air delivered to the downstream system. In a preferred embodiment, the equipment and methodology forms a complete system that can be used for general (Continued)

compressed air applications as well as in specific compressed gas processes that have a dry gas requirement.

22 Claims, 10 Drawing Sheets

(52) U.S. Cl.
 CPC .......... *B01D 53/261* (2013.01); *B01D 53/263* (2013.01); *B01D 53/268* (2013.01); *B01D 2257/80* (2013.01); *B01D 2258/06* (2013.01)
(58) Field of Classification Search
 USPC ............................................................ 62/93
 See application file for complete search history.

COMPRESSED GAS DRYING SYSTEM

CROSS REFERENCE TO RELATED APPLICATIONS

This patent application is the U.S. national phase of International Patent Application No. PCT/GB2017/053242, filed on Oct. 27, 2017 under the PCT (Patent Cooperation Treaty), which claims priority to Great Britain Patent Application No. 1618232.1, filed Oct. 28, 2016. International Patent Application No. PCT/GB2017/053242 and British Patent Application No. 1618232.1 are incorporated herein by reference.

FIELD OF THE INVENTION

The present invention relates to an apparatus and method for drying gas, compressed gas or gas mixtures, especially air. The present invention also relates to an apparatus and method for providing compressed gas or gas mixtures, especially air.

BACKGROUND

The presence of water and other solid and liquid contaminants within a pneumatic circuit or system is a continuing problem. For large capacity compressed air delivery systems where demand load can be reliably estimated and appropriate air quality classifications can be determined, suitable infrastructure planning can be used to alleviate demand load pressure drops and provide suitable and sufficient liquid and solid material filtering. However, for small capacity installations (<10 hp) which are required to meet a variety of applications, each with their own water vapour and contaminant requirements, the provision of compressed air of a reliable and repeatable quality remains problematic. Furthermore, where systems are used for multiple processes e.g. grit/abrasive blasting, spray painting or general pneumatic tool usage, the generation of liquid water within the system by one application may necessitate the need for system drying before commencement of another; this is difficult, time-consuming and costly.

As all the currently available small scale compressor systems utilise inline storage in the form of a receiver vessel to average out and reduce the system pressure drops associated with short periods of peak demand, these invariably store gas in a fully saturated state. In this condition, the compressed gas is unable to support any more water in vapour form and hence a dynamic equilibrium, controlled by temperature, exists between water vapour in the gas and liquid water which condenses in the pipework and along the bottom of the receiver. Under low-load conditions where flow rates are within the capacity of the compressor pump to supply, the gas in the receiver remains at high pressure, substantially above the output regulated pressure, and as there are negligible system pressure drops, the compressed gas can be delivered in an unsaturated state.

Although this arrangement of overcompressing the gas and storing saturated gas at elevated pressure is well known, it is only beneficial under low load conditions where the load is controlled and limited so as not to exceed the production capacity of the compressor. However, under higher load conditions, which may happen frequently, the system pressure can be much depressed resulting in the elimination of the pressure differential between the stored air in the receiver and the delivered air for end use. This leads to an increase in the saturated vapour pressure and hence the amount of water held in vapour form, which in turn leads to the delivery of low-pressure, saturated air. Under these conditions any reduction in the compressed air temperature, due to changes in the ambient environment or as a result of physical processes e.g. the Joule-Thomson effect, will result in the condensation of water within the compressed air delivery system.

For example, in air compressor systems when inlet air, having a relative humidity of 70% at NTP (normal temperature and pressure; 20° C. & 1013.25 hPa) is compressed to a pressure of 7 barg (8 bara or 8000 hPa) the temperature of the compressed gas increases in accordance with the ideal gas law. The pressure dew point of the compressed air also correspondingly increases with the increased pressure of the air. The dew point is the temperature at which the water vapour in a sample of air at constant barometric pressure condenses into liquid at the same rate at which it evaporates i.e. the temperature at which the air is saturated. The dew point definition usually refers to air at NTP while the pressure dew point defines this temperature at any given pressure condition, usually 7 barg, although other system pressures may be used for comparative analysis.

In the above example, the ambient air at 20° C., normal atmospheric pressure (1013.25 hPa) and 70% humidity has a dew point of 14.4° C. and an absolute humidity of 12.1 gm$^{-3}$. Therefore, water vapour will not condense out of the ambient air unless the temperature drops below 14.4° C. When this air is compressed to a pressure of 7 barg the temperature of the air will rise, based on an adiabatic approximation, to about 265° C. from which temperature it is rapidly cooled by conduction to a more manageable value of ~90° C., at which point it has a saturated vapour pressure (SVP) value of ~50,777 hPa (W. Wagner and A. Pru, "The IAPWS Formulation 1995 for the Thermodynamic Properties of Ordinary Water Substance for General and Scientific Use," J. Phys. Chem. Ref. Data 31, 387-535, 2002) and a pressure dew point of approximately 51° C. Thus, if at any point in the pneumatic circuit the temperature drops below this value, water vapour will condense out introducing liquid water into the circuit. Generally this air is further cooled to facilitate the condensation process and the liquid water removed from the system. If cooled to ambient (20° C.), the gas has a SVP of ~23.4 hPa and an absolute humidity of 2.1 gm$^{-3}$ with a corresponding ~9.9 gm$^{-3}$ of liquid water removed from the original 70% RH ambient air (12.1 gm$^{-3}$). The gas in this condition is saturated and is usually stored in the receiver. If, as in previously mentioned prior art, there is pressure differential (say 2 bar) between this stored air and the lower pressure delivered air, then the delivered air will have a water vapour pressure of 17.5 hPa and a pressure dew point of ~15.4° C., 4.6° C. below ambient temperature. Under these conditions, the delivered gas is unsaturated. Similar calculations can be justified for other gases and gas mixtures; for example compressed nitrogen which constitutes 78% of compressed air and produces very similar results.

However, under high-load conditions, the delivered gas will be at nominally (disregarding flow rate induced pressure drops) the same pressure as that in the receiver and hence will be saturated. High-load conditions essentially pull warm water vapour laden gas throughout the compression and gas delivery pipework system. Any drop in temperature will cause the formation of condensate in the delivery circuit. All these prior art examples deliver gas which has a water vapour content dependent upon the demand load and gas flow conditions. Additionally, in some very high flow rate applications, any water vapour that has condensed within the system can be entrained within the air stream forcing the water along the system pipework resulting in, if not significantly removed, high rate of pneumatic tool wear and process failure.

Whilst ~99% of the total liquid contamination found in a compressed air system is water, other contaminants present can have a significant detrimental effect on its performance and must be removed. Although liquid oil and oil aerosols are present as part of the lubrication system of the compressor, dirt and corrosion particles are generated by the interactions in the system itself. Whilst oil, oil vapour, dirt, rust and pipe scale can be relatively easily removed using high quality coalescence filters these devices are expensive, require routine inspection, timely filter element replacement and servicing, they have no effect upon the removal of water vapour. In addition, poorly maintained filter elements can reintroduce contamination and produce lossy system pressure drops. As the presence of liquid water in the system leads to the direct generation of corrosion products and their associated effects upon performance and system maintenance, a reduction in pneumatic tool lifetime, and a detrimental effect upon most pneumatic process applications, its removal at the earliest opportunity has a significant benefit.

As well as the over-compression and cooling mechanism considered above, there are a number of other methods based upon well understood water vapour removal technologies currently deployed. These include: intercoolers, located between the first and second compression stages; aftercoolers, located directly following the final compression stage; refrigerant, membrane, deliquescent and desiccant dryers. In addition to these commonly used methods there are a number of additional gas drying and gas to liquid phase conversion technologies aimed at specific applications which could also be used to dry compressed air. These include: cryogenic apparatus such as that outlined in U.S. Pat. No. 5,079,925 (Maric) which describes a multipurpose cryogenic apparatus for the chilling of gas or liquids, the condensation of condensable vapours and the separation of liquid and gas phases of a liquefied cryogenic gas; gas drying systems that utilise cooling technologies based on temperature separation within rotating gas streams like that proposed in G.B. Pat. No. 1,471,090 (Wilkerson) which utilises a vortex tube. Intercooler, aftercooler and refrigerant coolers utilise direct cooling of the compressed air in order to condense water vapour to form liquid water which can be easily removed. However, the amount of water removed also depends upon the pressure of the compressed air and this can vary as the cooling equipment is subject to pressure changes caused by load variations. In addition, as the potential maximum flow rates from a receiver can be significantly in excess of the generation capacity of the compressor, cooling equipment mounted after the receiver needs to be designed and installed to accommodate both a larger dynamic range and peak flow rate. Hence, installed drying equipment is typically physically large, expensive to purchase, operate and maintain. In addition, equipment mounted after the receiver operates in a lower and more varied pressure environment which has a detrimental effect upon its water removal efficiency due to the lower pressure dew point of the gas and its reduced density.

Intercoolers, if suitably designed, can be used to remove relatively large amounts of water vapour by dropping the gas temperature below the pressure dew point, usually ~33° C. for the primary stage of a 10 bar 2-stage compressor at NTP and ~70% RH. However, as the design of the majority of these intercoolers on smaller compressors are integrated with the compression head and designed primarily to increase compression efficiency, they are only capable of moderately cooling the gas and, as the gas temperature does not usually drop below the pressure dew point at this location, no liquid water is formed. Although this situation negates the need to drain the intercooler and provides some improvement in compressor efficiency, it allows near saturated gas through to the second stage of the compressor where it is further compressed and forms, after cooling, a water-saturated compressed air mixture. Even 2-stage compressors that utilise external intercoolers to cool to near ambient temperature and remove the condensed water using a drain will typically only be able to remove about 38% of the initial water. When further compressed from the typical 3.2 bar (first stage) to a 10 bar (second-stage) pressure the gas becomes fully saturated and is stored in the receiver in this state.

One other conventional solution aimed at preventing condensation arriving at the point of application or at other circuit elements is to use an aftercooler to cool the compressed air prior to the receiver in order to condense water vapour from the compressed gas. This is typically achieved using a passive or fan-cooled heat exchanger arrangement. Ideally the temperature of the compressed gas is reduced to ambient temperature where water vapour condensate is removed. This however can be prone to significant load-induced pressure variations that result in the delivery of compressed air having an indeterminate pressure dew point. A number of other conventional solutions involve the reduction in the water vapour in the compressed air directly through either active cooling (refrigerant dryers), adsorption (desiccant dryers), absorption (deliquescent dryer) or differential permeability (membrane dryers). Refrigerant dryers, placed after the receiver, use vapour compression refrigerant technology to cool the compressed air to temperatures just above freezing and are hence capable of processing compressed air to obtain minimum pressure dew points in the range of 3° C.; below this dew point there is a chance of the water freezing and system blockage occurring. These dryers must be sized in order to cope with the maximum flow rate capability of the receiver and its output regulator taking into account any drop in cooling efficiency due to pressure depressions in the stored supply. In some situations this may result in the specification of an over-sized refrigerant dryer or a significantly reduced cooling capacity under high demand load. In addition, unlike the current invention, refrigerant dryers do not operate in a controlled pressure environment, it being dependent on load and flow conditions, and hence although the pressure dew point temperature may be controlled, the absolute humidity of the delivered air can vary. Also unlike the current invention which, in its most basic form, requires no additional energy and provides a drying function only when the compressor is operational refrigerant dryers, due to their significant temporal start-up requirement and the intermittent nature of their load requirement need to be continuously powered.

In addition, membrane dryers which are capable of producing instrument quality compressed air with pressure dew points of between approximately −20° C. and −40° C. are simple devices that utilise the selective transport of water vapour through a polymeric membrane in order to reduce the water vapour content of compressed air. However, these devices are usually limited to lower flow rate requirements, have a high initial capital cost, require high quality water and oil coalescing pre-filters and suffer from a 15 to 25% dry purge compressed air loss. Membrane filters deployed after the main system receiver require similar sizing consideration to refrigerant dryers although additional compressed gas pre-drying equipment may also be implemented in order to reduce maintenance and filter replacement costs.

Desiccant dryers which utilise a cycled drying process to remove water vapour from the compressed gas also have a relatively high dry purge gas loss requirement and may also require additional energy input to operate desiccant recuperation heaters, or some other desiccant regenerative process, in order to regenerate the adsorbent material. Whilst some desiccant dryers are used for the processing of compressed air to produce very low pressure dew points, circa −70° C. are possible, gas of this dryness level is not generally required for even the most demanding workshop applications where pressure dew points above 3° C. (Class 4) are generally sufficient. Over-drying compressed air through the use of additional desiccant dryers has an obvious financial, environmental and maintenance cost.

Published patent specification GB. 1,471,090, Wilkerson Corp. discloses an application specific compressed air drying systems that utilises vortex tube cooling technology in conjunction with a pressure relief valve to produce a cold compressed air stream that can be used to cool and dry, through an air-to-air intercooler, the incoming air. An orifice controls the ratio of the hot stream to the cold stream through the vortex, and a pressure relief valve limits the delivered pressure, while bleeding off air to atmosphere. The capacity of the vortex tube being closely matched to the gas consumption of the gas operated means that are supplied, which have a substantially constant rate of gas consumption.

U.S. Pat. No. 5,079,925 (Maric) describes a multipurpose, gas-drying apparatus based upon a cryogenically cooled vessel which utilises a back pressure valve when the apparatus is operated in liquid and gas phase separation mode only.

SUMMARY OF THE INVENTION

The present invention provides a gas drying system for a compressed gas plant which has a gas reservoir and an output pressure regulator operable to limit the maximum pressure supplied from the reservoir to an outlet, the system comprising: a conduit for receiving a compressed gas and delivering it to a heat exchanger for cooling the gas; a pressure control valve; a water separator between the heat exchanger and the pressure control valve to remove condensate, wherein: the pressure control valve is operable to maintain the pressure of the compressed gas in the heat exchanger and the water separator at or above a first set pressure and to restrict flow into the reservoir when output demand exceeds supply; the maximum pressure supplied, from the reservoir to the outlet, is a second set pressure; and the first set pressure is equal to or higher than the second set pressure.

The present invention also provides a system for supplying compressed gas comprising: a gas intake, to deliver gas to a compressor operable to compress the gas and deliver compressed gas through a conduit to a heat exchanger for cooling the compressed gas; a gas reservoir; a water separator to remove condensate, between the heat exchanger and a pressure control valve; and an output pressure regulator operable to limit the maximum pressure supplied, from the reservoir to a system outlet, to a second set pressure, wherein: the first set pressure is equal to or higher than the second set pressure required at the system outlet; the pressure control valve is operable to maintain the pressure of the gas in the heat exchanger and the water separator at or above a first set pressure and to restrict flow into the reservoir when output demand exceeds supply; the compressor is operable to compress the gas to a pressure equal to or greater than the first set pressure.

The present invention also provides a gas drying system for a compressed gas plant which has a gas reservoir, the system comprising: a conduit operable to receiving a compressed gas and delivering it to a heat exchanger for cooling the gas; a pressure control valve operable to maintain the pressure of the compressed gas in the heat exchanger and the water separator at or above a first set pressure and to restrict flow into the reservoir when output demand exceeds supply; a water separator between the heat exchanger and the pressure control valve to remove condensate; and an output regulator operable to limit the maximum pressure supplied, from the reservoir to an outlet, to a second set pressure, wherein: the first set pressure is equal to or higher than a second set pressure at the outlet.

The present invention may also optionally comprise one or more of the following features:

The functions of the pressure control valve and the output pressure regulator combined in a single device such as to provide independent control of the setting of the output working pressure (second set pressure) and the relative dryness of the output gas. The combined output pressure regulator and pressure control valve device may utilise either a mechanical, pneumatic, electro-mechanical or hydraulic mechanism to couple the setting of the second set pressure to the setting of the pressure control valve, the first set pressure. For example, the system may comprise a valve control module which combines the functionality of the output pressure regulator and pressure control valve, wherein the first pressure set point is coupled, mechanically, pneumatically, electro-mechanically or hydraulically, to the second pressure set point such that both pressure settings increase and decrease proportionally through appropriate adjustment of the working output pressure setting control thus allowing the user to adjust the working pressure while maintaining the desired dew point suppression. The desired differential pressure setting can be obtained using the relative dryness setting control between the second pressure setting and the first pressure setting respectively such that the first pressure setting is greater than or equal to the second pressure setting.

The heat exchanger comprises an integral water separator and drain function between the input conduit (18) and the pressure control valve (24).

The pressure control valve comprises a spring or diaphragm or other electro-mechanically operated relief valve which open proportionally as the upstream pressure overcomes the pre-set spring or diaphragm pressure. The set pressure of this valve can be mechanically, pneumatically or electro-mechanically adjusted. The pressure control valve can function independently of the output pressure regulator or can be mechanically, pneumatically, electro-mechanically or hydraulic mechanism coupled with the output pressure regulator such that a single user control can be used to set the desired output working pressure and another control, integral or separate, the level of compressed air dryness.

The heat exchanger is a gas to gas heat exchanger.

The heat exchanger comprises an air blowing fan operable to increase the rate of cooling.

The heat exchanger comprises a supply of water and a set of water injection nozzles operable to wet the heat exchanger surface and promote evaporative cooling. The supply of water may preferably be directly connected to the conduit and operable to use the gas pressure to force the water contained in the supply of water through the injection nozzles and onto the heat exchanger.

The heat exchanger comprises a vessel containing a volume of liquid maintained at a temperature above 0° C., or liquid having a bulk temperature greater than the freezing point of water, and the conduit may be made from a heat conducting material, with the conduit immersed in the volume of liquid.

An active cooler after the heat exchanger is operable to further reduce the temperature of the compressed gas. The active cooler may operate using a cooling process selected from evaporative cooling, the Peltier effect; the vapour-compression cycle or the absorption-cooling cycle. When the active cooler comprises an absorption cycle refrigeration system, the heat of compression contained in the compressed gas may be used to provide energy to drive the absorption-cycle refrigeration system.

One or more temperature sensors operable to monitor the output temperature of the gas; one or more pressure sensors operable to monitor the pressure of the gas; and an electronic control interface, ECI, connected to the sensors and operable to provide either open or closed loop control of a gas dryness level.

A solenoid controlled drain valve operable to release water collected by the water separator, and the ECI is configured to control the solenoid controlled drain valve.

A heater coil comprising the conduit placed in the reservoir prior to the heat exchanger.

A dryer module selected from a membrane dryer, a deliquescent dryer and a desiccant based dryer; wherein the dryer module is placed after the heat exchanger and the water separator and before the pressure control valve, if provided.

The ECI, if included, may further comprise one or more of the following:

A display or display/controller user interface connected directly or via any wireless communications protocol to the ECI; wherein the temperature and pressure sensors 42 monitor the output temperature and pressure of the compressed gas from the heat exchanger respectively and the ECI processes the signals and provides an indication on the display of the minimum dryness level of the compressed gas.

An ambient temperature sensor, and a valve actuation mechanism coupled to the pressure control valve wherein the ECI is configured to provide closed loop control of the gas dryness level by measuring the ambient temperature and the compressed gas temperature and pressure; determining a required first set pressure based upon the measured gas temperature, pressure and ambient temperature to achieve a required absolute humidity in order to maintain the dryness of the gas at the outlet and adjusting the first set pressure by adjusting the pressure control valve. The system may further comprise an output setting sensor coupled to an output pressure regulator, wherein the ECI is configured to adjust the first set pressure of the gas based upon the sensed setting of the output pressure regulator.

The present invention also provides a method of drying gas, comprising: receiving a compressed gas; cooling the compressed gas in a heat exchanger and collecting and removing condensed water from the compressed gas using a water separator whilst maintaining the pressure at or above a first set pressure using a pressure control valve, which is operable to restrict flow into a reservoir when output demand exceeds supply; delivering the compressed gas from the reservoir for an end use, at a second set pressure controlled by an output pressure regulator, wherein the first set pressure is equal to or higher than the second set pressure.

The present invention also provides a method for supplying compressed gas comprising: receiving a gas; compressing the gas using a compressor; cooling the compressed gas in a heat exchanger and collecting and removing condensed water from the compressed gas using a water separator whilst maintaining the pressure at or above a first set pressure using a pressure control valve which is operable to restrict flow into a reservoir when output demand exceeds supply; delivering the compressed gas from the reservoir for an end use, at a second set pressure controlled by an output pressure regulator, wherein: the first set pressure is equal to or higher than a second set pressure required at a system outlet; and the compressor is operable to compress the gas to a pressure greater than the first set pressure.

The method may optionally comprise one or more of the following steps:

Increasing the rate of cooling the gas is increased using a fan.

Wetting the heat exchanger surface to promote evaporative cooling.

Providing cooling by evaporative cooling, the Peltier effect; the vapour-compression cycle or the absorption-cooling cycle. Preferably using the heat of compression contained in the compressed gas to provide energy to drive an absorption-cycle chiller.

Monitoring the temperature and pressure of the gas using one or more sensors and providing an electronic control interface, ECI, 44, connected to the sensors and operable to provide either open or closed loop control of a gas dryness level.

Monitoring the temperature and pressure of the gas and the temperature of the ambient environment using one or more sensors and providing an electronic control interface, ECI, 44, connected to the sensors and operable to provide either open or closed loop control of a gas dryness level.

The ECI configured to provide closed loop control of the gas dryness level by: measuring the ambient temperature (58), the compressed gas temperature and pressure (42); determining a required first set pressure based upon the measured gas temperature, pressure and ambient temperature to achieve a required minimum absolute humidity in order to maintain the dryness of the at an outlet, and adjusting the first set pressure by adjusting the pressure control valve (24).

Adjusting the first set pressure of the gas based upon a sensed output setting of an output pressure regulator.

Adjusting the first set pressure of the gas based upon the sensed output setting of an output pressure regulator and the temperature of the ambient environment.

Providing a simple open loop control system that adjusts the first set pressure, which is mechanically, pneumatically, electro-mechanically or hydraulically coupled to the adjustment of the second set pressure ensures the two pressure set points are proportionally adjusted while an additional differential control of the first pressure set point enables the relative dryness level to be controlled given that the first pressure set point is equal to or greater than the second pressure set point.

Providing a closed loop control mechanism such that the pressure control valve and the output pressure regulator are coupled pneumatically.

Providing a closed loop control mechanism such that the pressure control valve and the output pressure regulator are coupled mechanically or electro-mechanically.

The output pressure regulator and pressure control valve device combined in a single device and configured such that adjustment of the output pressure regulator (second set pressure) automatically actuates the pressure control valve (first set pressure) such that a constant pressure differential is maintained between the two valve settings such that the relative dryness level of the compressed gas remains constant.

The gas or compressed gas to be dried by the invention may comprise a mixture of gases that includes water vapor. The gas or compressed gas is preferably air. The gas may also be a mixture of hydrogen and water vapor. The invention can be applied to any gas or compressed gas mixture where a suitable relationship between dew point and saturation vapor pressure can be determined, and where water can be condensed from the gas without other chemical or phases changes occurring.

Comparison With Prior Art

The current invention utilises a pressure control valve to restrict the compressed air flow below a settable pressure level (first set pressure) and hence directly control the amount of water removed from the gas before its storage and subsequent supply, as an unsaturated gas, at a reduced pressure (second set pressure). The pressure relief valve detailed in GB 1,471,090 (Wilkerson) is used as a device to vent gas to atmosphere; thus limiting the output pressure to a maximum value in order to maintain a substantial pressure differential, 4.8 to 5.8 Bar (70 to 85 psi) across the vortex tube and to establish optimum air flow conditions through the tube to enable a suitable cooling and drying level. Functionally the pressure control valve in the present invention is used to maintain the pressure of the compressed gas in the heat exchanger and to restrict flow when output demand exceeds supply, thereby providing a demand independent supply of dry compressed air. The pressure relief valve in Wilkerson is designed to provide a significant pressure drop across the vortex tube ensuring adequate gas flow is achieved for the generation of cold air to produce adequate drying action. As can be appreciated upon careful examination, the device described by Wilkerson, unlike the present invention, does not provide the ability to control the pressure at the outlet independently from the pressure in the heat exchanger. Also unlike the present invention, the Wilkerson system, which requires that the vortex tube device is operated under near optimal cooling conditions through careful matching of fixed vortex tube parameters to demand requirement, can only provide dry air under substantially constant demand conditions. In addition, unlike the current invention, the Wilkerson system does not provide any means of setting a first set pressure independent of load demand or have any means of providing a second set pressure. In further contrast, vortex cooling based gas dryers, unlike the present invention, require continuous compressed air flows, even under zero demand conditions, to provide suitable air drying within well define air flow conditions. The consequence of which, results in significant losses of dried processed gas when the demand load reduces from the designed operating point. Additionally, if the demand load exceeds the designed operating point, there will be no dried gas lost through pressure relief valve and the gas will be dried to specification, but the system will be unable to maintain output pressure as the system is incapable of accumulating a reservoir of gas at elevated pressure and maintaining correct operation.

In the present invention, the gas in the heat exchanger is maintained at a first set pressure by the pressure control valve, even when there is demand at the outlet that exceeds the capacity of the compressor.

The present invention utilises, in combination, an intercooler and pressure control valve to maintain a temperature controlled pressure environment before the pressure control valve, controlling the water vapour to liquid phase conversion (condensation) rate and hence the pressure dew point of the gas or gas mixture. The pressure relief valve in Marie (U.S. Pat. No. 5,079,925) on the other hand is utilised to pressurise the vapour phase of a single compound cryogenic liquid/gas mixture and provide a motive force for the delivery of the separate liquid and vapour phase components to the point of use. In this mode there is no removal or mechanism for the removal of a contaminant species from the single compound, multiphase cryogenic mixture or any functional use of the included intercooler arrangement on the processing of this mixture. In addition, when operated in this mode Marie does not consist of and show the same arrangement of functional elements indicated in this patent. In further addition, when the mode of operation utilises the intercooler arrangement (chilling of gas or liquid and the condensation of condensable vapours), the liquid and/or gas to be chilled and the flow control valve arrangement in the process line, in combination with the cryogenic liquid coolant and the lack of a contaminant removal mechanism, preclude the use of this apparatus for the applications described in this patent and indicate its differing operational method.

The current invention removes water from the compressed air by forming a well-defined temperature and pressure environment, unlike prior art directly coupled intercooler and receiver arrangements, which can be prone to significant load-induced pressure variations that result in the delivery of compressed air having an indeterminate pressure dew point.

Advantages of the Present Invention

A significant portion of applications and end uses of compressed air simply require a supply of liquid water free compressed air without the need to lower the dew point of the air more than a few degrees below ambient temperature. What the current invention offers is the energy efficient removal of water from compressed air to a sufficient level to satisfy such applications relative to the ambient conditions of the point of use. Unlike existing air drying technologies and techniques which either incur the consumption/loss of a significant portion of the compressed air or require the input of significant energy for gas cooling, our invention provides a mechanism of maximising the benefit that can be derived from the energy used in the initial air compression process. This ensures that the primary energy (electrical or other) input to the system used to compress the gas is always used to enhance the drying process irrespective of the rate of consumption of the compressed air by end use applications.

An advantage of the present invention is that it may provide a reliable, consistent supply of dry air.

Another advantage of the present invention is that it may provide a reliable, consistent supply of compressed gas, particularly air.

Another advantage of the present invention is that it may provide a maximum pressure dew point that is variable and controllable.

Another advantage of the present invention is that the system is operable at consistent load conditions to provide efficient operation.

Another advantage of the present invention is that it may ensure precise and accurate control of the degree of dryness and associated conditions of gas, particularly air.

An advantage of the present invention is that it provides control of the dew point of a compressed gas containing water vapour such that various levels of dew point suppression below the temperature to which the compressed gas is supplied can be obtained irrespective of the rate of consumption by end use applications without the loss of process gas.

An advantage of the present invention is that it provides a restricted range of mechanical loading on the primary drive motors. Thus enabling the drive motors to be closely matched to the load and allowing the motors to be consistently operated at points of maximum efficiency.

An advantage of the present invention, using an example of one embodiment where the gas is air, is explained thus: inlet air, having a relative humidity of 70%, and an absolute humidity of ~12.1 $gm^{-3}$, at NTP (normal temperature and pressure; 20° C. & 1013.25 hPa) is compressed to a pressure of 10000 hPa (10 bara or 9 barg). The temperature of the compressed gas increases according to the ideal gas law. Initially, following an approximate adiabatic compression, the saturation vapour pressure of the compressed gas will greatly exceed the compressed water vapour pressure (162 hPa) and no water vapour will be condensed. However, as the temperature of the gas cools due to conduction and radiation in the system pipework and components the temperature of the air will drop below the dew point of the gas at this pressure (~55.5° C.) and water vapour will be condensed. As the air is further cooled by the drying system, more water vapour will be condensed. In this example, cooling the compressed air to close to ambient temperature, 20° C., at which the saturation vapour pressure (SVP) is 23.4 hPa, will result in the gas having an absolute humidity of 1.75 $gm^{-3}$, a water loss of approximately 10.35 $gm^{-3}$. When stored at 8000 hPa (7 barg) in the receiver vessel, at ambient temperature, the vapour pressure in the compressed air is now ~18.7 hPa, 4.7 hPa below the SVP indicating a pressure dew point of 16.4° C., a suppression of 3.6° C. below ambient temperature.

Hence application of this unsaturated air to the circuit elements will not result in water vapour condensation as the circuit elements are at a temperature of 3.6° C. above the pressure dew point of the compressed gas. If, as in the implementation detailed above, the ambient air temperature were to increase to say 25° C., without any appreciable change in the ambient air pressure or relative humidity, then the water vapour pressure of the compressed air would rise from 22.2 hPa at ambient pressure to 219 hPa at an air pressure of 10000 hPa (9 barg). Cooling the compressed gas to ambient temperature (25° C. in this case) would result in a condensed water vapour loss of approximately 13.8 $gm^{-3}$ from an initial absolute humidity of 16.13 $gm^{-3}$ at ambient to 2.33 $gm^{-3}$ at pressure. When stored at 8000 hPa (7 barg) in the receiver vessel, at ambient temperature (25° C.) the compressed air has a water vapour pressure of 25.3 hPa, a pressure dew point of 21.3° C. and a dew point suppression of ~3.7° C. The dew point suppression temperature differential tracks with ambient temperature change.

A further advantage is given in an example of another embodiment active cooling can be seen to further reduce the pressure dew point of the delivered compressed air. Inlet air at NTP and 70% relative humidity is compressed to 10000 hPa (9 barg) resulting in a water vapour pressure of 162 hPa, a dew point temperature of 55.5° C. and an absolute humidity of 12.1 $gm^{-3}$. Active cooling of the compressed gas to 10° C. will result in a water loss of ~11.2 $gm^{-3}$ leaving the compressed air with an absolute humidity level of 0.92 $gm^{-3}$. When stored in the receiver at 7 barg the water vapour pressure drops to 9.8 hPa giving a dew point of ~6.7° C., a dew point suppression of ~13.3° C. at this pressure. When returned to ambient the compressed air has a relative humidity of ~5.3%.

Implementations of the invention may negate the problem associated with excessive demand, of the elevation of pressure dew point and the transport of increased levels of water content in the compressed air, through the use of the pressure control valve. Unlike the function of the output pressure regulator, the function of the pressure control valve is to maintain an upstream pressure above a minimum set limit by restricting the flow of gas through the valve until the desired upstream pressure is reached; once the minimum set pressure limit (first set pressure), is reached the valve opens allowing gas to flow downstream and conversely if output demand exceeds supply, the valve will restrict flow to maintain upstream pressure and thereby imposing an upper limit on the elevation of the pressure dew point. This has the advantage of allowing the drying process of compressed air to be independent of the load demands placed upon the system.

The function of the output pressure regulator is to match the flow of gas at higher pressure from the receiver through the regulator to the demand for gas at the output in order to maintain a lower pressure at its output and to limit this to a maximum set value (second set pressure). Under conditions of high demand, when the flow rate of demand exceeds the flow rate that can be delivered by the compressor pump, the valve in the regulator opens fully to match flow to try and maintain the second set pressure. When the high demand is sustained this can result in significant depressurisation of the whole of the compressor supply system to pressures well below the intended second set pressure. In existing compressed air systems this results in warm, low pressure compressed air having pressure dew points elevated significantly above ambient temperature to be passed from the supply system on into the pneumatic circuits and the point of use.

The pressure control function can be implemented using a number of different valve arrangements. The simplest implementation utilises a spring or diaphragm operated relief valve which opens proportionally as the upstream pressure overcomes the pre-set spring or diaphragm pressure. Adjustment of the threshold pressure is achieved by mechanical adjustment of the spring or diaphragm loading of the valve. Pneumatically operated valves may also be used. This has the advantage of providing a simple user adjustment to control level of gas drying as required for setting of the output working pressure.

The replacement of the pressure control valve and the output pressure regulator with the dual valve arrangement which through mechanical, electro-mechanical or pneumatic coupling of the setting mechanisms of the pressure control and the pressure regulator valves allows the setting of relative dryness (dew point suppression) to automatically track with the output pressure (second set pressure) without need for adjustment of the pressure control valve. This arrangement of the valves provides the advantage of presenting the user with simple independent setting controls; one to set the working output pressure, the other to set the relative dryness (dew point suppression) of the output gas.

Implementation of the invention using mechanical, electro-mechanical pneumatic or hydraulic actuated valves facilitates the adoption of electronic control systems to manage the operation of the air drying system. The further addition of sensors to measure the ambient temperature, and the temperature and pressure of process gas at the point of liquid water separation enables the implementation of full closed loop control of the pressure control valve enabling the system to dynamically adjust the process gas pressure to compensate for variations in process gas and ambient temperature and to provide precise control of the pressure dew point limit setting. Hence ensuring liquid water free delivery of compressed air at the point of use for all modes of operation without use of excess energy associated with the over drying the air. Additional benefit associated with the adoption of a comprehensive electronic control system, as outlined above, can be achieved through the implementation of complex control algorithms including machine learning algorithms.

Metal oxide particulate waste in the form of scale and rust is generated in metal pipework systems and from steel based compressor system parts as a direct response to the presence of liquid water and vapour in the compressed gas. Significant reductions in the amount of water vapour and the elimination of liquid water from the system of this invention can significantly reduce this type of contamination. Reduction in contamination levels enables maintenance and filter change intervals to be increased, improves valve performance, lifetimes and sealing, improves replacement schedules on high cost items such as receivers and removes the need for daily system draining. In addition, the removal of liquid water prior to storage has a number of substantial benefits:

Power-tool life can be significantly extended as wear and water based damaged is significantly reduced even under high demand load use. Supply air maintained in an unsaturated state enables a greater range of compressed air tool functions and processes to be undertaken. Where processes are sensitive to the presence of water, the generation of liquid water through the Joule Thomson effect at the point of use can be problematic, a situation which can be greatly improved through the supply of suitably unsaturated compressed air having adequate pressure dew point suppression.

In one aspect, the invention enables the processing of compressed gas directly from the compressor and the generation and storage of demand independent, unsaturated compressed air. In addition, as the water removal processing function of the invention is coupled to the ambient temperature environment, a consistent unsaturated gas condition can be maintained as the ambient temperature varies. As processing and water removal from the compressed air is conducted prior to the pressure control valve, the gas supplied to and stored in the receiver has a minimum dryness condition. This, combined with the operation of the pressure control valve or its variants ensures that even when the pressure in the receiver drops (due to high air demand) the dryness level of the air is unaffected. This functionality has significant benefit to the user as the compressed air system components following the pressure control valve can be maintained in a liquid water free condition where the generation of liquid water can, if required, be eliminated.

Since the pressure control valve maintains the pressure in the gas drying system, this provides efficiency benefits associated with the heat exchanger and the compressor drive motor as well as any secondary air drying equipment. The consistently high gas pressure in the heat exchanger ensures that process temperatures are significantly elevated above ambient providing the maximum temperature differential relative to ambient, providing the highest possible rates of heat transfer for the system. Additionally, consistent elevated pressure and lowest possible flow rates within the system further contribute to improved heat exchanger performance. Existing compressed air systems drive motors have to accommodate mechanical loads that vary from the maximum load which occurs when the compressor is compressing gas to the maximum pressure limit down to near zero when the whole system is de-pressurised or running unloaded. Unlike existing systems, with the exception where the load on the drive motor is temporarily removed to enable initial start-up, the invention restricts the load range over which the motor has to operate; determined by the minimum pressure setting of the pressure control valve and the maximum compression limit of the compressor. This allows the motors to consistently operate in a region of optimal efficiency, whilst producing dried compressed gas, without recourse to supplementary technology which thereby adds cost and complexity to the existing systems. In comparison, this is unlike existing systems, which until the gas in the receiver reaches design working pressure, operate inefficiently in terms of useful power consumption and the delivery of compressed air having elevated dew point.

In another aspect of the invention, consisting of an active cooling element either replacing the heat exchanger or working in conjunction with it, pressure dew points of close to 0° C. are possible. Although current existing technologies are used to provide this cooling function the consistent mass flow rate of the gas across the pressure control valve alleviates the need to provide equipment capable of dealing with the larger flow rates and dynamic flow variations present in conventional refrigerant based gas drying systems. In addition to physically smaller coolers, equipment located in the-consistent pressure environment established by the pressure control valve work more efficiently due to the higher pressure and density of the compressed air. In most low power compressor systems the heat of compression is seen as a waste product that must be removed as efficiently as possible. However, this energy may be utilised as the heat source in an absorption based cooler located in series with or in place of the heat exchanger. Hence the otherwise wasted heat of compression can be used more efficiently.

Some embodiments provide cooling to ambient temperature and hence the level of drying/unsaturation/pressure dew-point/absolute humidity will track with variations in ambient temperature.

Other embodiments with evaporative based cooling will produce cooling to a temperature below ambient temperature dependent upon the wet bulb temperature—hence will track to some temperature below ambient—giving greater levels of drying/unsaturation.

With active mechanical absorption cycle or electrical cooling, the system will cool below ambient, limited to temperatures above 0° C. (freezing point of water), and dependent upon power input to active cooling devices providing improved drying capability and energy efficiency when compared to existing demand side actively cooled drying systems.

With the addition of either a desiccant, deliquescent or membrane based dryer placed following the active cooling and water separation components but prior to the pressure control valve additional operational benefits in terms of improved drying capability and improved energy efficiency when compared to current practice are possible.

In one implementation of the pressure control valve as part of the air drying system, the invention provides the benefit to the compressed air system user of the ability to adjust the level of the minimum dryness of the delivered gas as maybe required for different applications. This may be achieved by means of changing the pressure setting of a spring or diaphragm type pressure relief valve with mechanical screw adjuster with a setting indicator and a calibrated scale.

In one implementation of the system for supplying compressed air the pressure control and the output pressure regulator functions are implemented such that a single control is used to set the maximum delivery pressure of the gas and another to control the relative dryness level of the gas.

In a further aspect of the invention, measurement and display of the pressure and the temperature of the compressed gas exiting the heat exchanger may be used to give the operator an indication of the dryness level of the gas. Such an indication may be used to provide a simple means of controlling both the minimum set pressure and, if active cooling were available, the minimum temperature of the heat exchanger and cooler arrangement. This arrangement would provide significant benefit to the operator as it would allow the minimum dryness of the gas to be changed and optimised for a number of different power and process applications.

In a further aspect of the invention, a closed loop control system may be utilised in order to provide additional benefit. The provision of ambient temperature measurements in addition to process gas temperature and pressure measurements in conjunction with an automated pressure control function, output setting sensor, a process controller, microcontroller or microprocessor based control system, offers the benefit of being able to provide precise control of the pressure dew point limit in response to any user defined setting while accounting for environmental temperature changes within the limits of the operational range of the gas drying system. Closed loop control of the invention provides automated control of the dryness content of the delivered gas for different power and process applications without the cost penalties associated with over drying the gas.

In a further aspect of the invention, a requirement for high quality instrument or breathing air may be met with the addition of either desiccant, absorption or membrane drying systems. These systems can be employed in both the traditional manner, after the main receiver, or in a novel arrangement before the pressure control valve. In the first arrangement benefits are obtained from the pre-removal of water vapour in accordance with the pressure setting of the pressure control valve and the temperature of the heat exchanger. In the second arrangement similar benefits to those seen in the active cooling arrangement can be realised in terms of dryer sizing, capital and maintenance cost and improved efficiency. In addition, the pre-removal of significant amounts water vapour improves the regenerative process cycling and desiccant replacement schedule of desiccant dryer as well as improving the operational lifetime performance of membrane drying systems with the ultimate benefit of reduced costs.

In a further aspect of the invention, the inclusion of heating to one or all of the system components prior to the pressure control valve and operation of the system at pressures slightly above ambient pressure provides a simple and dynamic method of controlling the relative humidity of a gas, usually air or hydrogen, delivered at ambient or slightly above ambient pressure. For example in the case of air. Ambient air at 20° C. and 70% RH which has a vapour pressure of 16.4 hPa at ambient, when compressed to 2000 hPa (2 bara) shows a doubling in vapour pressure to 32.3 hPa (SVP=23.4 hPa at 20° C.) indicating that the gas is fully saturated. Heating of the components prior to the pressure control valve to 25° C. and exhausting the gas to ambient results in an air supply having a 68% RH content. Careful control of the compression pressure and/or the temperature of the system components prior to the pressure control valve enables relative humidity control of the air when exhausted from between about 50% to 100% RH; the pressure sensitivity being approximately 36% RH/bar and the temperature sensitivity approximately 4.27% RH/° C. under these initial conditions. In the case of hydrogen, humidity control of this type is also possible if a temperature-controlled, fully saturated hydrogen gas stream is used under similar compression and temperature control conditions.

Applications of the Present Invention

The present invention relates to a gas or gas mixture, particularly air, drying system.

The present invention also relates to compressed gas or gas mixture, particularly air, dying system.

The present invention is particularly suited to compressed gas, particularly air, systems used for example to provide compressed air for power tools, paint spraying, shot-blasting, sanding and polishing operations, dry-air pharmaceutical manufacture and formula preparation. The present invention is also particularly suited to gases for dentistry and other medical and industrial operations.

The present invention is also suited to the humidity control of compressed gases or gas mixtures, particularly air and hydrogen, used in the provision of building humidification and fuel delivery systems respectively.

BRIEF DESCRIPTION OF THE DRAWINGS

In order that the invention may more readily understood, a description is now given, by way of example only, reference being made to various embodiments of the present invention, in which.

DETAILED DESCRIPTION OF THE DRAWINGS

Figure 1:
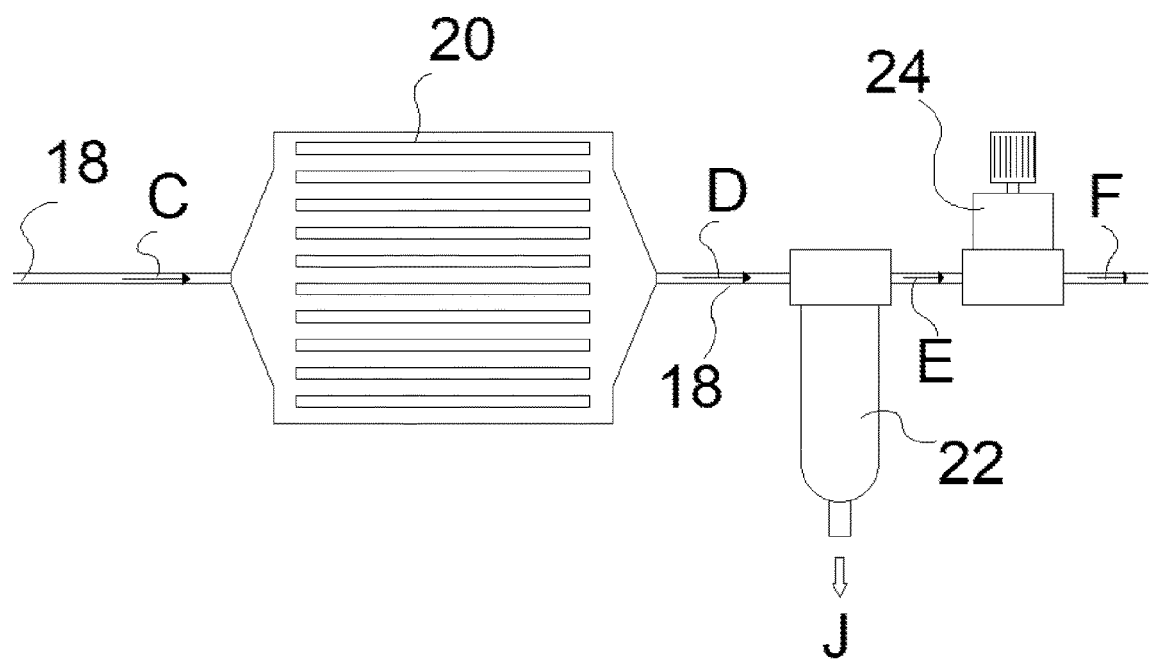
FIG. 1 is a schematic diagram of an air drying system embodying the present invention.

In FIG. 1, an embodiment of the invention is shown. An air drying system comprises a heat exchanger 20, a water separator 22 and a pressure control valve 24. The drying system receives compressed air via conduit 18. Hot compressed air (C) from, for example, a compressor is cooled in the heat exchanger 20 to ambient or near ambient temperature causing the water vapour to condense into liquid water, so that the air at (D) contains condensate, which is then removed by the water separator 22. The pressure control valve 24 maintains the pressure in the heat exchanger 20 and the water separator 22 below a first set pressure as controlled by the valve actuation method utilised in the pressure control valve 24. The air at position (E) will be saturated, and allowed to expand through the pressure control valve 24. The air at position (F) will be at a second set pressure, lower than the first set pressure, and suitable for the desired end use. This air will have a maximum water vapour content as controlled by the exit temperature of the heat exchanger 20 and the first set pressure of the pressure control valve 24. Due to the lower pressure, the air will no longer be saturated, and will have a lower absolute humidity than the compressed air received at the start.

The invention typically comprises three functional elements: a heat exchanger to cool the compressed air, a water separation device to remove liquid water, and a pressure control valve. The air drying system is designed to be incorporated as part of a compressed air supply system comprising, but not limited to: a compressor, capable of compressing air to pressure in excess of the intended first set pressure, which compresses air having initial water vapour content as determined by ambient conditions; the air drying system; a receiver storage vessel to provide a reservoir of compressed air and an output pressure regulator to limit the maximum pressure (second set pressure) delivered to the pneumatic circuit elements from the receiver vessel.

Water may be systematically removed from the water separator 22 manually or by using an automatic drain valve. The automatic drain valve may be an pneumatically or electrically controlled.

Figure 2:
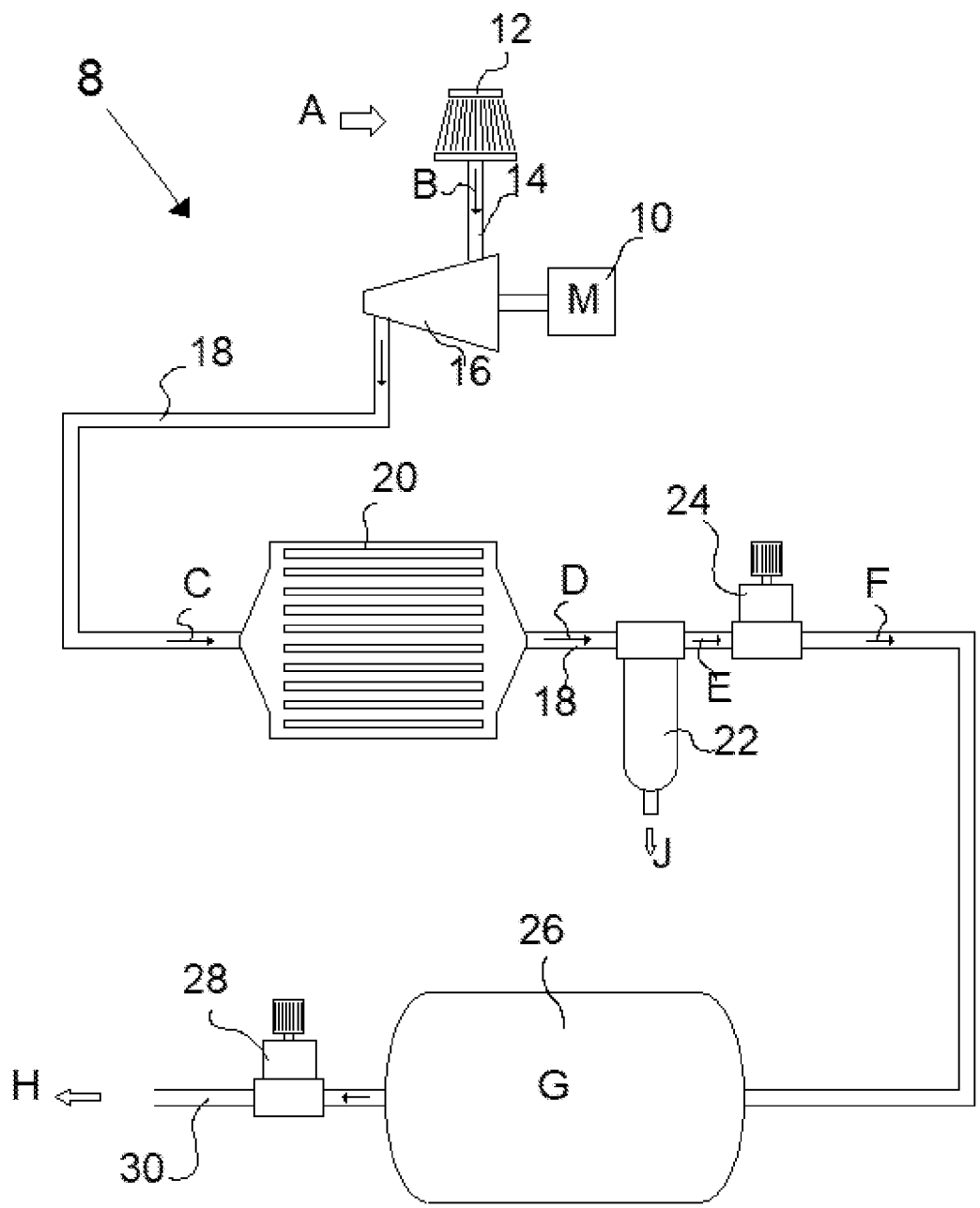
FIG. 2 is a schematic diagram of a compressed air supply system embodying the present invention.

FIG. 2 shows an embodiment of a compressed air system in accordance with the present invention, generally indicated at reference numeral 8. The system has an air intake and particle filter 12 for accepting air A having an initial water content as determined by ambient conditions. The intake air B is delivered to a compressor pump 16 via a conduit 14. The compressor pump 16 is driven by a motor 10. The compressor pump 16 compresses the intake air to above a first set pressure equal to the pressure set by a pressure control valve 24 before flowing through to the heat exchanger 20 via conduit 18. The process of the compression of the air results in an increase in temperature. The hot compressed air C is cooled down to a lower temperature in the heat exchanger 20 resulting in the condensation of the water which can no longer be supported in the vapour phase, at the set pressure, into the liquid phase giving a mixture of saturated air and liquid water condensate D.

The liquid water condensate is then separated from the saturated air by means of a water separator device 22. The liquid water collected by the water separator device 22 is then periodically expelled from the system using a draining device fitted to the water separator 22 with only the saturated air (E) being presented at the output of the water separator 22.

The pressure control valve 24 remains in the closed position up to the point where the pressure generated by the compressor pump 16 in the heat exchanger 20, water separator 22 and associated piping 18 equals the pressure control valve 24 opening set pressure (first set pressure). As the compression process continues and more air is pumped from the compressor 16, rather than inducing an increase in pressure, the pressure control valve 24 opens allowing the air to flow on into the storage/receiver tank 26. The storage/receiver tank 26 is then charged with pre-conditioned air having a dew point as set by the exit temperature of the heat exchanger 20 and the pressure set by the pressure control valve 24. The output pressure regulator 28 limits the maximum pressure that the compressed air can be supplied to the pneumatic circuits and end uses via conduit 30. The pressure control valve 24 sets a first set pressure below which no air is passed from the upstream conditioning system, of the heat exchanger 20 and the water separator 22, on to the receiver tank 26 thus ensuring only air having a maximum dew point temperature, or below, can be delivered into the receiver tank 26. The air in the receiver tank can then be drawn on for the consumption of the end use application at any given rate without giving rise to an increase in the dew point of the delivered air above that set by the exit temperature of the heat exchanger 20 and the pressure control valve 24. For air with an initial water vapour content that produces saturated air when compressed to a first pressure set by the pressure control valve 24 exceeding the second pressure setting of the output regulator 28, only compressed air in an unsaturated state will be supplied to the end use applications as long as the ambient temperature does not drop significantly between the time the air was compressed, and the time it is distributed to the end use via pneumatic circuits.

It is not always the case that the gas stored in the receiver will be unsaturated, but the delivered gas from the output regulator is always unsaturated. Hence the system maintains unsaturated gas delivery from the reservoir. It may be preferable, in order to reduce compressor energy use, to avoid pressurising the reservoir to a higher pressure than is required by the output regulator, in which case the system will maintain unsaturated gas within the reservoir.

In a variant of the invention, an air blowing fan may be used to facilitate more efficient cooling of the heat exchanger 20.

In a further variant, an air blowing fan, a supply of clean preferably distilled water and a set of water injection nozzles are utilised to provide a source of evaporative cooling. Either controlled directly via a pump or through direct connection to the pneumatic circuit by which compressed gas is used to force the water through the injection nozzles and onto the heat exchanger. This directed water spray in conjunction with air flow supplied by the fan facilitates evaporative cooling of the heat exchanger and further cooling of the compressed gas within it. In dry to reasonably humid environments, this cooling method can produce temperature depressions below ambient limited by the wet bulb depression temperature.

Figure 3:
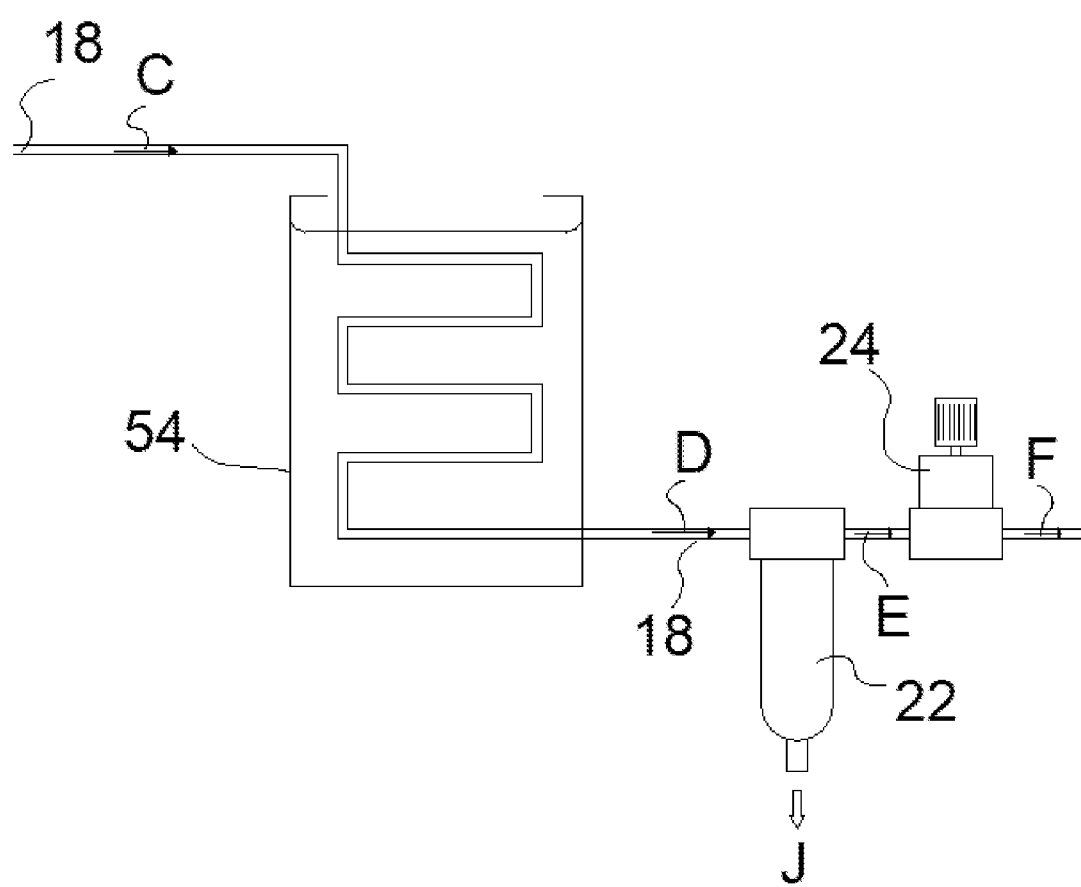
FIG. 3 shows a gas to liquid heat exchanger of one variation of the invention.

In another variation, shown in FIG. 3, a simple air to liquid heat exchanger 54 provides the cooling function within the invention. Cooling to near ambient temperature is achieved by immersing the thermally conductive compressed air conduit 18 in a vessel containing a volume of liquid maintained above the freezing point of water, most commonly, but not limited to, water which provides a large thermal heat sink in equilibrium with the environmental temperature.

It should be noted for easiest operation that the water separator 22 should be mounted lower than the heat exchanger 54 to obtain the benefits of gravitational water flow. This embodiment provides the benefits associated with mechanical simplicity of reliability and low cost.

Figure 4:
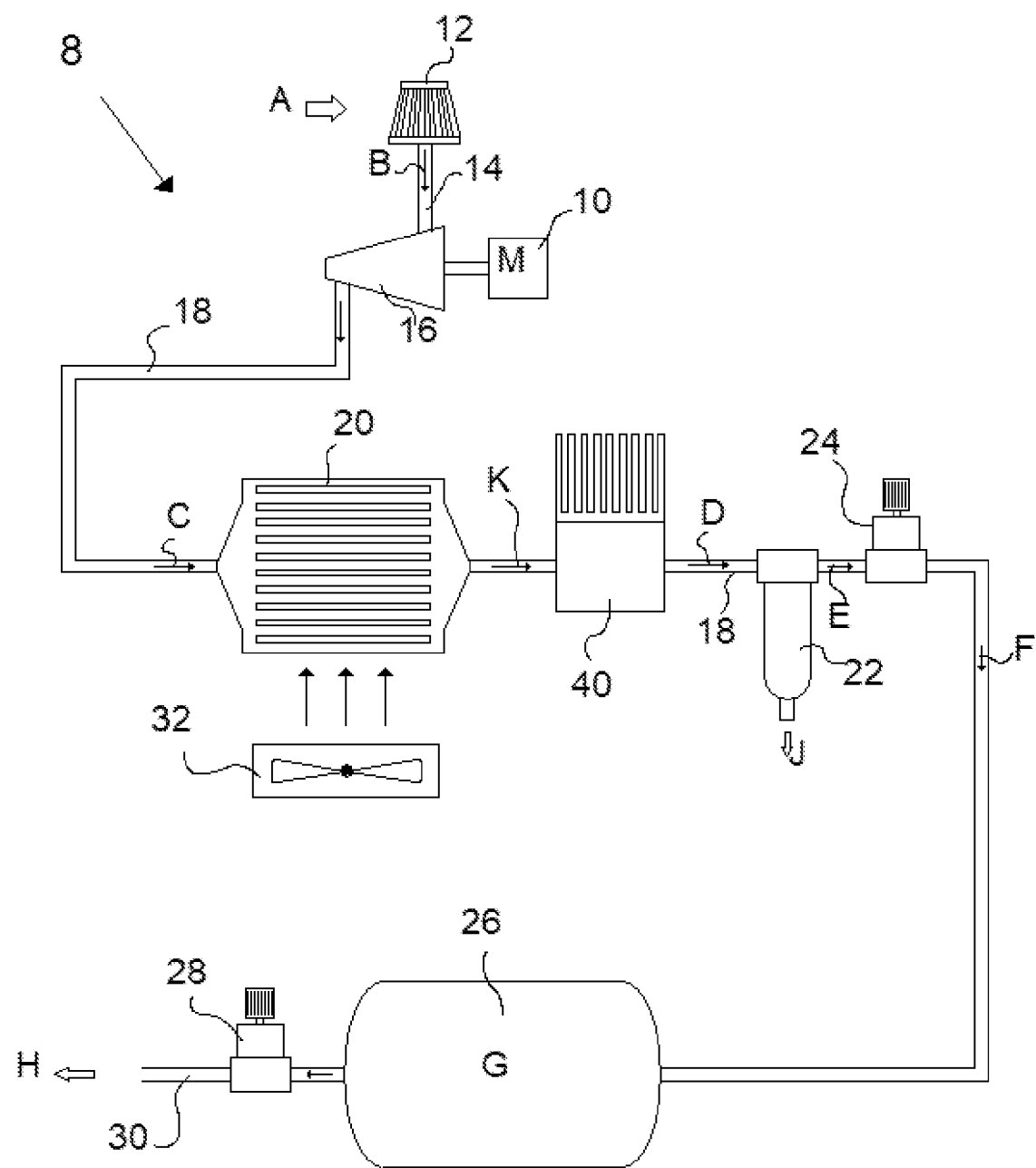
FIG. 4 shows a variant of the invention with active cooling after the heat exchanger.

A further embodiment, FIG. 4, utilises the efficiency benefits achieved when compressed air is cooled at high pressure using an active cooler such as a vapour compression refrigerant based or Peltier heat pump, which may provide additional cooling below ambient temperature. In standard configurations coolers are placed after the receiver and are subject to a depressed pressure condition and must be sized for significantly higher flow rates and flow rate variations. In this embodiment, the location of the cooler 40 prior to the receiver 26 improves equipment efficiency and reduces the capital, running and maintenance costs of using this technology. Similar size reductions to those obtainable using refrigerant technologies are easily achievable using a smaller cooler than is required in conventional refrigerant based systems.

Figure 5:
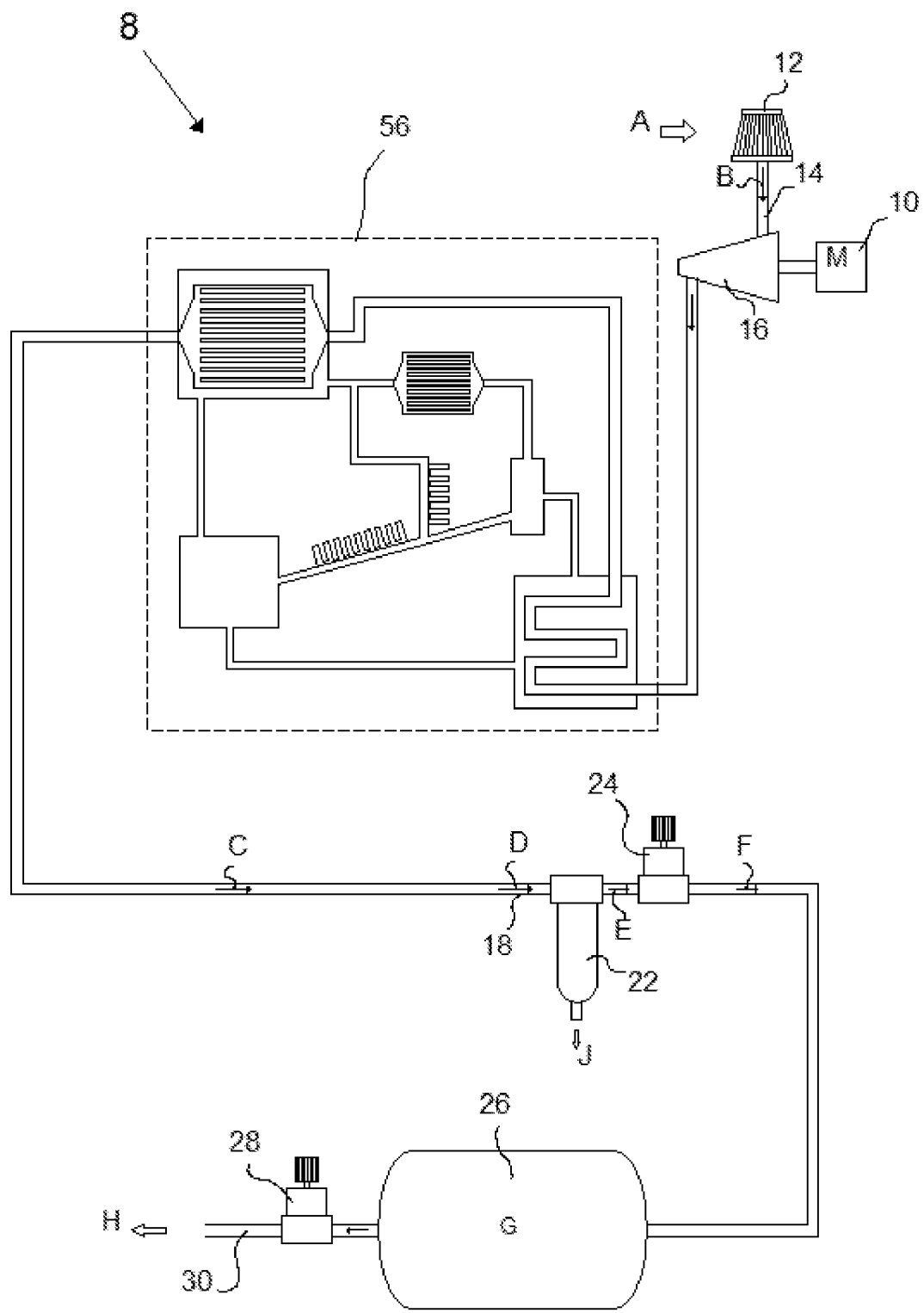
FIG. 5 shows an embodiment of the invention utilising an absorption cycle refrigerator.

In a further embodiment shown in FIG. 5, the addition of an absorption-cycle refrigeration system has the benefit of providing active cooling and energy efficiency benefits through the utilisation of the hot compressed air from the compressor pump to power the active cooling system. The heat of compression contained in the compressed air is used to provide energy to drive the boiler in an absorption-cycle heat exchanger 56. This embodiment also has the benefit of a cooling system capable of providing rates of cooling directly proportional to the rate of compressed air production in addition to the benefit of reliability associated with absorption-cycle refrigeration systems and the cooler efficiencies present when cooling at pressure as noted previously.

Figure 6:
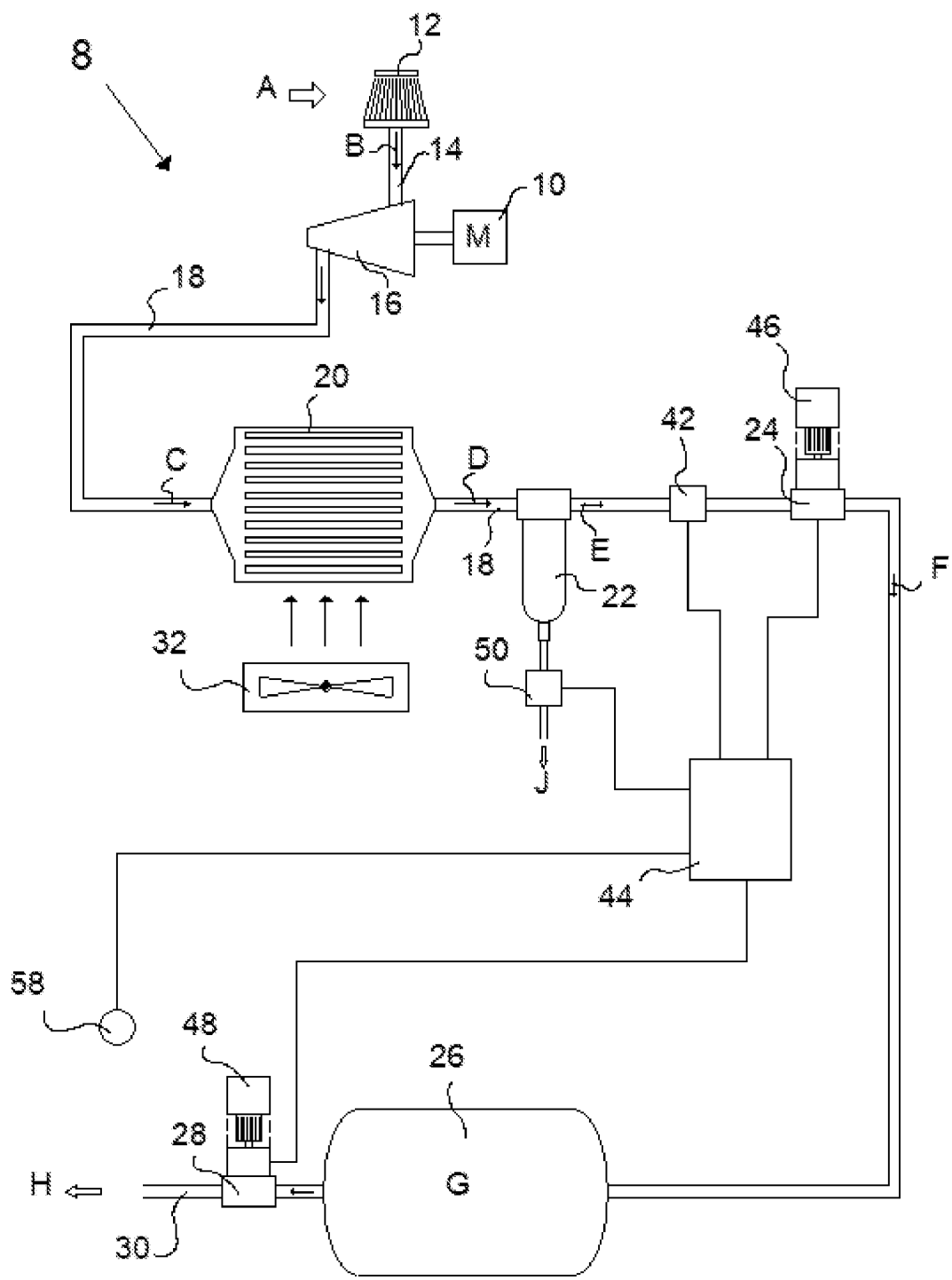
FIG. 6 shows a variant of the present invention with a closed loop control system.

In a variation illustrated by FIG. 6, an electronic control interface (ECI), 44 is used to provide either open or closed loop control of the gas dryness level. When used in the open loop arrangement, temperature and pressure sensors 42 monitor the output temperature and pressure of the compressed air from the heat exchanger respectively. The ECI processes the signal and optionally provides an indication on some form of display of the minimum dryness level of the compressed air. When used in closed loop control the ECI is connected to an array of temperature and pressure sensors 42, 58, valve actuation mechanism 46 coupled to the pressure control valve, and an automatic drain valve 50. Measuring the ambient temperature 58 and the process air temperature and pressure at E enables the minimum absolute humidity of the air to be established. This measurement is then compared with the ambient temperature 58 so that the pressure control valve 24 can be adjusted in order to control the water content of the compressed air within the receiver 26 at (G). The system may also comprise output setting sensor 48 coupled to the main system regulator 28, wherein the pressure setting of the main system regulator 28 is used by the ECI to ensure that a positive pressure differential can be established and maintained between compressed gas at (E) and (G). The solenoid controlled drain valve 50 may be controlled directly from the ECI otherwise an automatic drain valve may be used.

It is also envisaged that the ECI could actively control the setting of the output pressure, for example by controlling an actuator connected to a calibrated regulator. This would allow the user to make the setting via some form of control panel, interface or mobile device, and the ECI would automatically set the pressure control valve to a suitable first set pressure to ensure that the delivered gas is of a requisite level of dryness.

Figure 7:
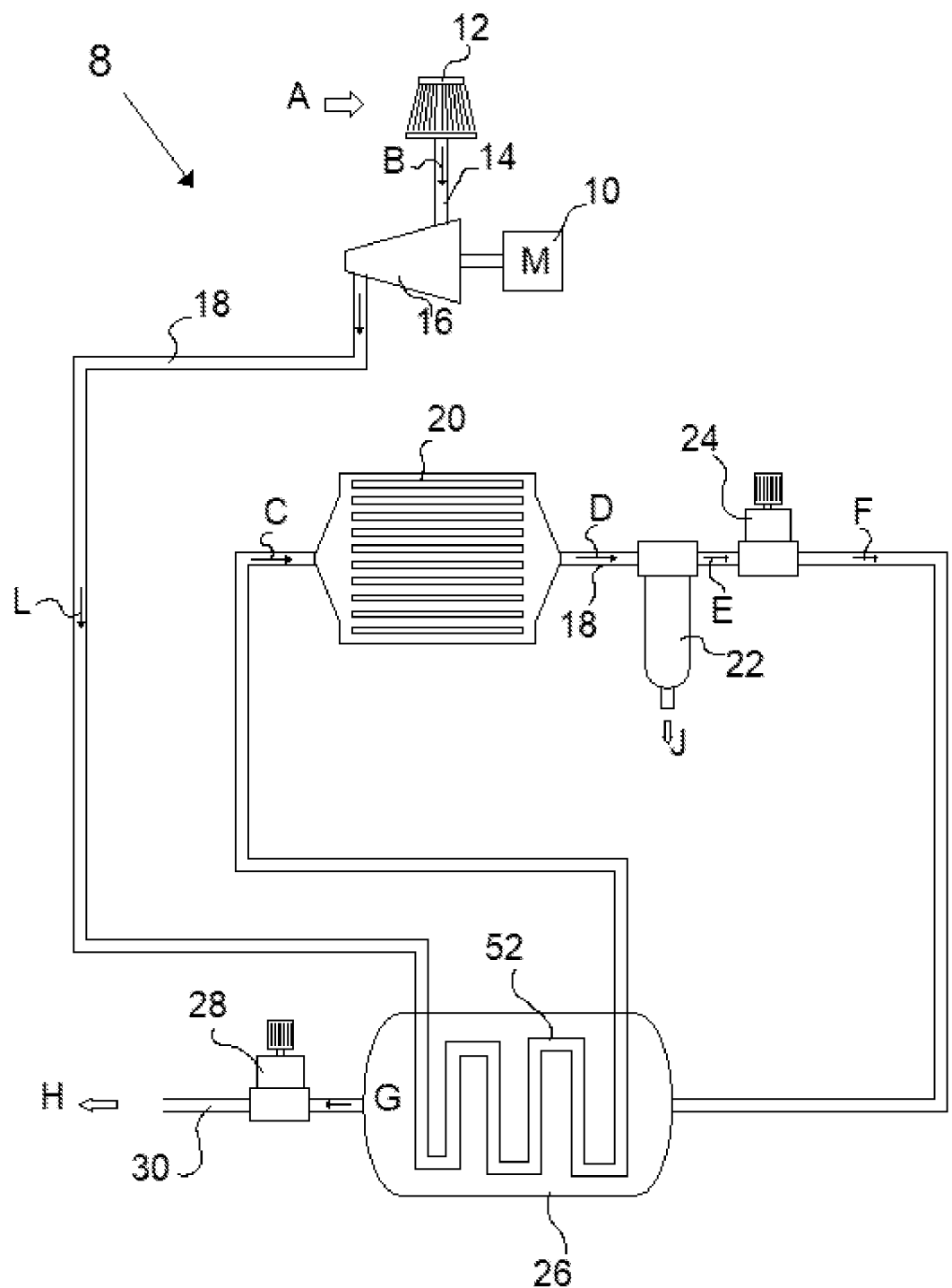
FIG. 7 shows a variant of the invention using the heat of compression to preheat the receiver gas.

In another variation of the invention, as shown in FIG. 7, the heat of compression from the compressor 16 in conduit 18 is used to pre-heat the air in the receiver 26 at G. In this embodiment a heater coil 52 is placed in the receiver body prior to the heat exchanger 20, water separator 22 and pressure control valve 24 arrangement. This allows the heat of compression to raise the temperature of the dried air in the receiver tank. This has the effect of decreasing the relative humidity of the air and for short pipe runs further reduces the likelihood of water vapour condensation within the delivery pipework.

Figure 8:
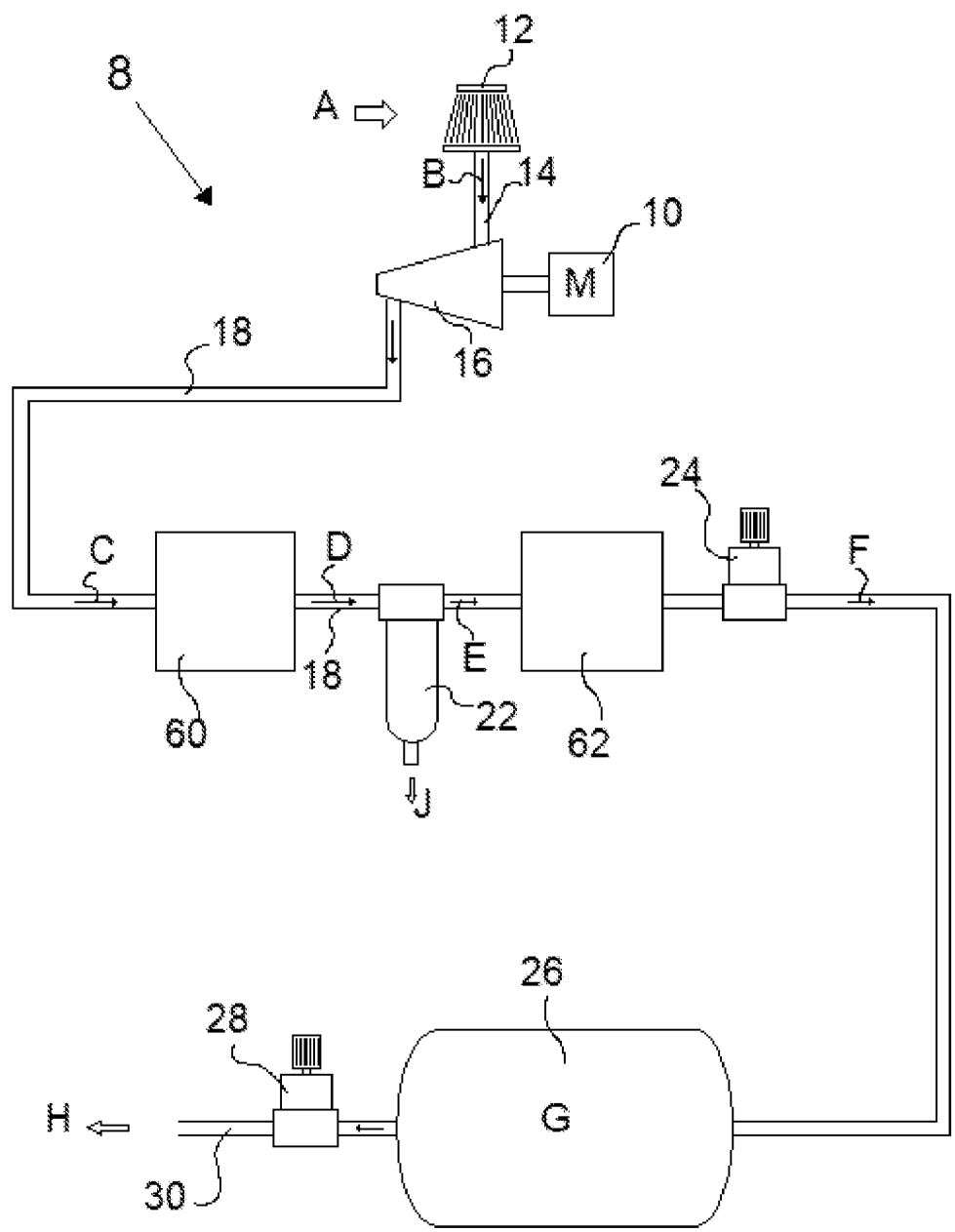
FIG. 8 shows an embodiment of the invention using air cooling and drying technologies.

In a further embodiment of the invention, shown in FIG. 8, a cooling module 60 consisting of any single or combination of either a passive or fan assisted heat exchanger arrangement or an evaporative cooling arrangement or an active cooler arrangement followed by a water separator 22 is used to remove about 90 to 95% of the total water content in the compressed gas. Following this the gas is then processed by a dryer module 62 consisting of any single or combination of a membrane dryer, deliquescent or desiccant based dryer prior to the pressure control valve 24 in order to remove the majority of the remaining water vapour. This arrangement utilises the benefit of operating the cooling and drying technology in a controlled pressure environment free from demand induced pressure variations where these technologies work most effectively. In addition, the removal of the majority of the water vapour from the compressed air by the cooling module limits the water vapour content of the compressed air into the subsequent drying technologies providing the benefits of improved operational lifetime, reduced media consumption and regeneration rates, lower dry gas purge losses and lower capital equipment and maintenance costs.

Figure 9:
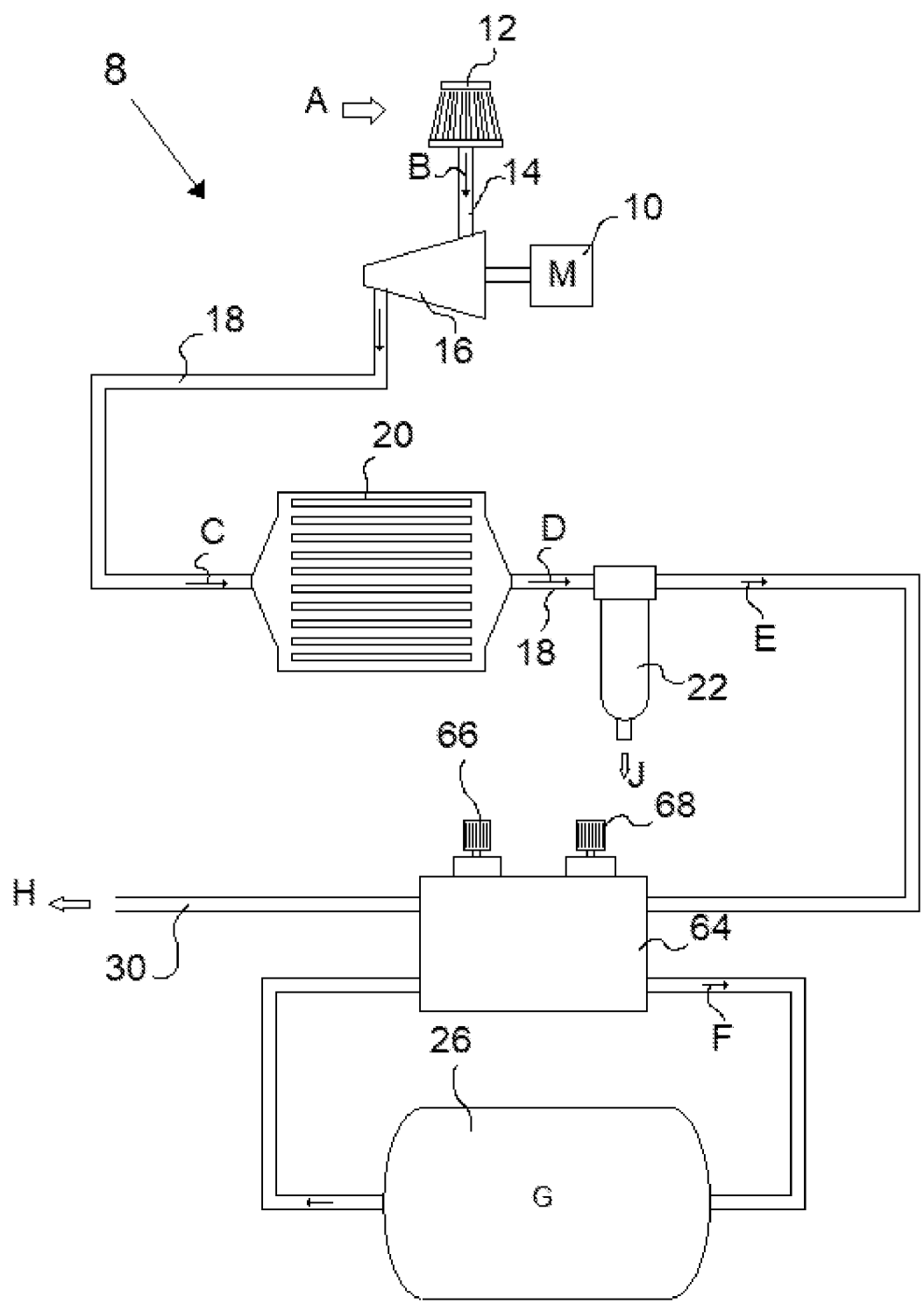
FIG. 9 shows an embodiment of the invention using a combined valve device to provide independent controls for dryness level setting and output pressure setting.
Figure 10:
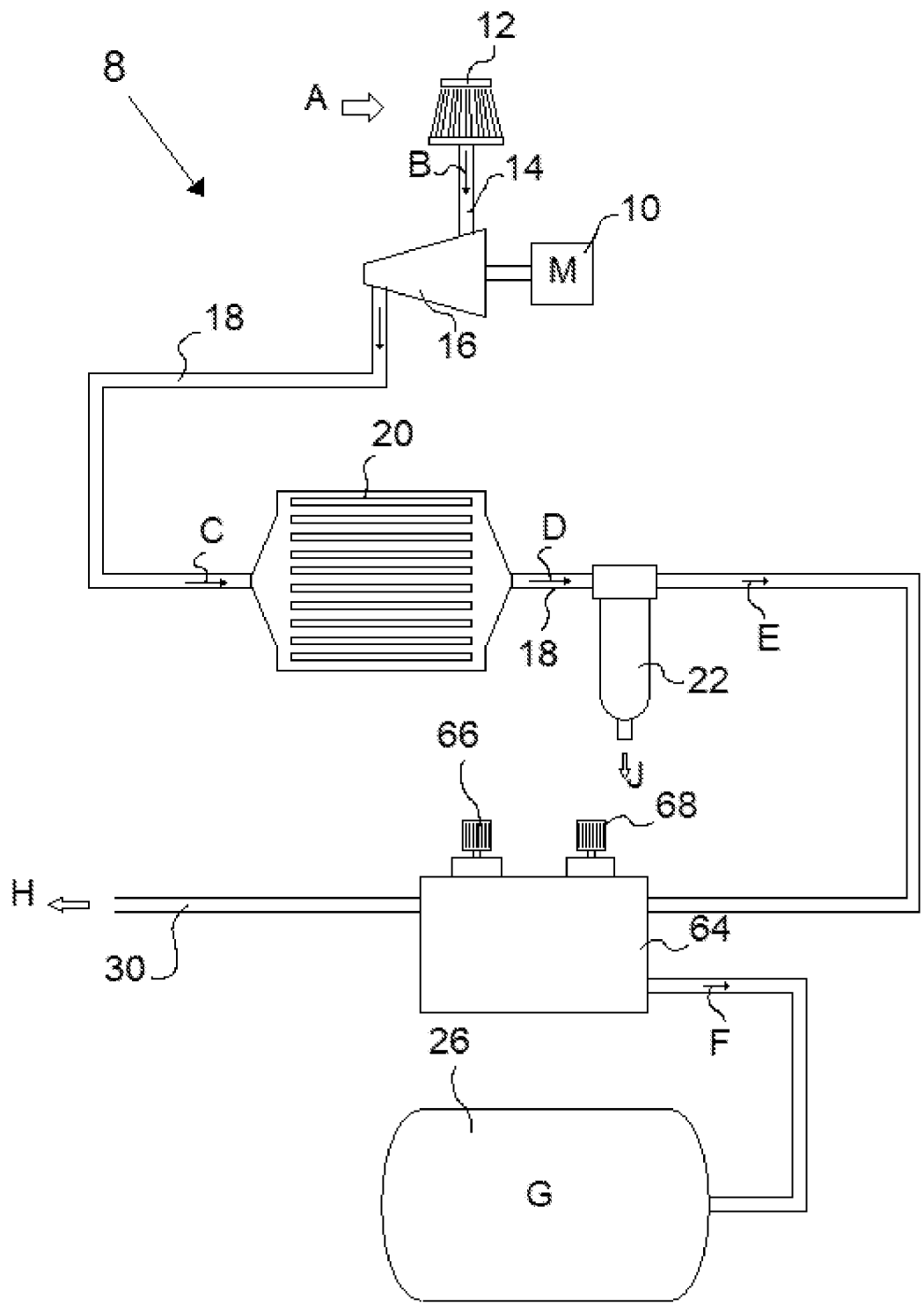
FIG. 10 shows a variation to FIG. 9 using a combined valve device to provide independent controls for dryness level setting and output pressure setting with the receiver acting as an air accumulator.

In a further embodiment of the invention, shown in FIG. 9, a control module 64 combining the functions of the output pressure regulator and pressure control valve is used to provide the independent setting of the second set pressure 66 (maximum output pressure regulator setting) and the level of relative compressed air dryness 68. In one variant of this embodiment the receiver 26 is mounted serially between the output port of the relative dryness setting control valve 68 and the input port of the working output pressure setting control valve, FIG. 9. In another variant, FIG. 10, of this embodiment the output port of the relative dryness setting control valve 68 and the input port of the working output pressure setting control valve 66 are connected through a section of T-connection pipe; the third port of this pipe is connected to the receiver 26.

Further advantages may be gained in any of the embodiments or variations described above by feeding back the pneumatic pressure at the output of the pressure regulator to the pressure control valve in order to provide a means to automatically adjust the setting of the pressure control valve in response to changes made to the setting of the actual output working pressure. The configuration of this variant of the pressure control valve is such that the direct setting of the pressure control valve provides a simple relative dryness control where the output pneumatic pressure feedback is used to supplement the relief pressure setting, hence increasing the valve-closing force proportionally with increase in the actual working pressure. This variant of the pressure control valve can be implemented in any one or more of a number of different ways: direct pneumatic action within valve, mechanical or hydraulic transduction of pressure to provide force to adjust the direct setting mechanism.

The use of this form of closed-loop pressure feedback may be implemented in at least the following two ways: firstly, such that the adjustment of the pressure control valve tracks continuously with output pressure across the full range of output pressure or secondly, where the tracking with output pressure is limited such that it can only act when the output pressure is above a settable limiting value. The first and simplest implementation of closed-loop feedback due to the continuous tracking with output pressure, dependent upon the setting of the relative dryness level, may degrade overall system humidity control performance during periods of significant load demand resulting in the reduction of output pressure to levels below the desired set value. The second approach eliminates any potential degradation of humidity control performance and can be implemented using an additional secondary pressure relief valve arranged in series either at the input, before, or output, after, the closed-loop feedback pressure relief valve. Alternatively, the secondary pressure relief valve can be included in the pressure feedback loop in combination with a unidirectional by-pass valve. When combined in parallel with a unidirectional by-pass valve, this valve arrangement will maintain the feedback pressure applied to the controllable valve even when the output pressure falls below the setting of the secondary pressure relief valve.

These approaches enable the inherent benefits of closed-loop control to be realised within the present invention, these benefits including: accurate control of the relative gas dryness level of the compressed gas; automatic dryness tracking with variations in output pressure; simple low-cost implementation. These advantages can be realised without the need to co-locate both the pressure control valve and output pressure regulator. A further refinement of this closed-loop feedback arrangement is achieved by taking the tapping for the pressure feedback directly from the outlet at the point of use and compensating the gas drying action to provide precisely the requisite amount of drying whilst maximising energy efficiency through the avoidance of excessive drying.

Some discussion of the term relative dryness may be helpful. As one skilled in the art will understand, the properties of humid air or other gases may be described in terms of pressure, temperature and relative humidity. Other terms may be used, such as wet bulb temperature, dry bulb temperature, saturation vapour pressure, dew point, absolute humidity and other terms that are suitable to particular fields of operation. The particular terms chosen to describe the relative dryness of a gas may depend on the required end use, but throughout this description increased dryness may be taken to mean a reduction in dew point temperature, or reduction in relative humidity. An analogue of relative dryness can be expressed in terms of the pressure difference between the gas in the heat exchanger and the reservoir or supplied gas, which may be sufficient for many end uses. The relationship between the different values can be determined by various empirical or theory based formulas such as those found in the reference "The IAPWS Formulation 1995 for the Thermodynamic Properties of Ordinary Water Substance for General and Scientific Use" mentioned earlier.

Although the present invention is particularly useful for removing moisture from humid air, the invention can be applied to any gas or compressed gas mixture where a relationship between dew point and saturation vapor pressure can be determined, and where water can be condensed from the gas without other chemical or phases changes occurring. The invention can therefore be utilised to increase the dryness level of compressed gas, particularly a gas or mixture of gases selected from nitrogen, oxygen, hydrogen or noble gases.

GLOSSARY

8—Compressed air drying system
10—Motor to drive compressor pump
12—Air Intake including air cleaning filter
14—Air intake conduit
16—Air compressor pump
18—High pressure compressed air conduit
20—Heat Exchanger (with or without an integral water separation and drain function)
22—Water Separator Device with drain
24—Pressure control valve
26—Compressed air storage/receiver tank
28—Output pressure regulator
30—Regulated pressure compressed air conduit
32—Air blower fan
34—Water Tank
36—Water Spray Nozzle
38—Tank Pressurisation tube
40—Active Cooler (solid state cooler or vapour compression refrigerant system)
42—Temperature and Pressure Sensor Module
44—Electronic control interface
46—Servo actuated pressure control valve
48—Output Setting Sensor
50—Solenoid controlled drain valve
52—Pre-cooler
54—Air to liquid heat exchanger
56—Absorption cycle refrigerant heat exchanger
58—Ambient temperature sensors
60—Cooler based drying technologies
62—Drying technology (Absorption, Adsorption, Membrane)
64—Combined output pressure regulator and pressure control valve device
66—Working output pressure setting control
68—Relative dryness setting control

The invention claimed is:

1. A gas drying system for a compressed gas plant which has a gas reservoir, the system comprising:
   a conduit operable to receiving a compressed gas and delivering it to a heat exchanger for cooling the gas;
   a pressure control valve operable to maintain a pressure of the compressed gas in the heat exchanger and a water separator at or above a first set pressure and to restrict flow into the gas reservoir when output demand exceeds supply;
   the water separator located between the heat exchanger and the pressure control valve to remove condensate; and
   an output regulator operable to limit the maximum pressure supplied, from the reservoir to an outlet, to the second set pressure, wherein: the first set pressure is equal to or higher than a second set pressure at the outlet.

2. The system of claim 1 wherein the functions of the pressure control valve and the output pressure regulator are combined to provide independent control of a setting of an output working pressure and a relative dryness of an output gas.

3. The system of claim 2 wherein a single device utilizes either a mechanical, pneumatic, electro-mechanical or hydraulic mechanism to couple the setting of the second set pressure to the setting of the pressure control valve, the first set pressure.

4. The system of claim 2 further comprising the heat exchanger with an integral water separator and drain function between the conduit and the pressure control valve.

5. The system of claim 2 wherein the pressure control valve comprises a spring or diaphragm operated relief valve configured to open proportionally as an upstream pressure overcomes a pre-set spring or diaphragm pressure.

6. The system of claim 2, wherein the heat exchanger is a gas to gas heat exchanger.

7. The system of claim 6, wherein the heat exchanger comprises an air blowing fan operable to increase a rate of cooling.

8. The system of claim 7, wherein the heat exchanger comprises a supply of water and a set of water injection nozzles operable to wet a surface of the heat exchanger and promote evaporative cooling.

9. The system of claim 8 wherein the supply of water is directly connected to the conduit and configured to use the pressure of the gas to force the water contained in the supply of water through the injection nozzles and onto the heat exchanger.

10. The system of claim 2, wherein the heat exchanger comprises:
a vessel containing a volume of liquid having a bulk temperature greater than the freezing point of water, and
wherein the conduit is made from a heat conducting material, and the conduit is immersed in the volume of liquid.

11. The system of claim 2, further comprising an active cooler located after the heat exchanger and operable to further reduce a temperature of the compressed gas resulting in a greater portion of a water vapour phase contaminant being condensed into liquid phase for removal by the water separator.

12. The system of claim 11, wherein the active cooler is configured to use a cooling process which is selected from evaporative cooling, a Peltier effect, a vapour-compression cycle or an absorption-cooling cycle.

13. The system of claim 12, wherein the active cooler comprises an absorption cycle refrigeration system, configured to use the heat of compression contained in the compressed gas to provide energy to drive the absorption-cooling cycle.

14. The system of claim 2, further comprising:
one or more temperature sensors operable to monitor an output temperature of the gas;
one or more pressure sensors operable to monitor the pressure of the gas; and
an electronic control interface (ECI) connected to the one or more temperature sensors and the one or more pressure sensors and operable to provide an open loop control or a closed loop control of a gas dryness level.

15. A method for supplying compressed gas comprising:
receiving a gas;
compressing the gas using a compressor;
cooling the compressed gas in a heat exchanger and collecting and removing condensed water from the compressed gas using a water separator whilst maintaining a pressure at or above a first set pressure using a pressure control valve which is operable to restrict flow into a reservoir when output demand exceeds supply;
delivering the compressed gas from the reservoir for an end use, at a second set pressure controlled by an output pressure regulator,
wherein:
the first set pressure is equal to or higher than the second set pressure required at a system outlet; and
the compressor is operable to compress the gas to a pressure greater than the first set pressure.

16. The method of claim 15, wherein a rate of cooling the gas is increased using a fan.

17. The method of claim 16, further comprising wetting a heat exchanger surface to promote evaporative cooling.

18. The method of claim 16, wherein cooling is provided by evaporative cooling, a Peltier effect; a vapour-compression cycle or an absorption-cooling cycle.

19. The method of claim 18, wherein the cooling is provided by an absorption-cooling cycle refrigeration system, wherein the heat of compression contained in the compressed gas is used to provide energy to drive the absorption-cooling cycle refrigeration system.

20. The method of claim 16, further comprising:
monitoring a temperature and the pressure of the gas using one or more sensors; and
providing an electronic control interface (ECI) connected to the sensors and operable to provide either open or closed loop control of a gas dryness level.

21. The method of claim 20, wherein the ECI is configured to provide closed loop control of the gas dryness level by:
Measuring an ambient temperature, the compressed gas temperature and pressure;
determining a required first set pressure based upon the measured gas temperature, pressure and ambient temperature to achieve a required minimum absolute humidity in order to maintain the dryness of the gas at an outlet, and
adjusting the first set pressure by adjusting the pressure control valve.

22. A system for supplying compressed gas comprising:
a gas intake;
a compressor operable to compress gas received from the gas intake via a conduit;
a heat exchanger for cooling gas received from the compressor;
a water separator for removing condensate from gas received from the heat exchanger;
a gas reservoir for receiving gas from the water separator;
a system outlet for receiving gas from the reservoir;
a pressure control valve between the water separator and the gas reservoir, and operable to maintain the pressure of the gas in the heat exchanger and the water separator at or above a first set pressure and to restrict flow into the reservoir when demand from the system outlet exceeds the capacity of the compressor; and
an output pressure regulator between the reservoir and the system outlet, and operable to limit the maximum pressure supplied from the reservoir to a system outlet to a second set pressure,
wherein the first set pressure is equal to or higher than the second set pressure.

* * * * *